United States Patent [19]
Balbo et al.

[11] Patent Number: 5,675,113
[45] Date of Patent: Oct. 7, 1997

[54] DEVICE FOR COUPLING A RECOIL MECHANISM TO A CRADLE AND METHOD FOR TRANSPORTING AN ARTILLERY WEAPON

[75] Inventors: Patrick Balbo; Philippe Grelat, both of Bourges; Guy Malassenet, Pigny; Fabienne Mandereau, Bourges, all of France

[73] Assignee: Giat Industries, Versailles, France

[21] Appl. No.: 490,158

[22] Filed: Jun. 14, 1995

[30] Foreign Application Priority Data

Jun. 17, 1994 [FR] France ................. 94 07476

[51] Int. Cl.⁶ .................................. F41A 25/00
[52] U.S. Cl. ................. 89/42.01; 89/43.01; 89/44.01; 89/37.14
[58] Field of Search ............... 89/42.01, 43.01, 89/44.01, 37.14; 42/69.01

[56] References Cited

U.S. PATENT DOCUMENTS

| | | | |
|---|---|---|---|
| 1,358,386 | 11/1920 | Moriarty | 89/43 |
| 1,922,080 | 8/1933 | Driggs, Jr. | 89/43 |
| 1,948,497 | 2/1934 | Barnes | 89/37 |
| 2,213,953 | 9/1940 | Conlon | 89/43 |
| 2,275,632 | 3/1942 | Joyce | 89/43 |
| 2,352,233 | 6/1944 | Summerbell et al. | 89/43 |
| 2,732,766 | 1/1956 | Weiss et al. | 89/44 |
| 3,969,982 | 7/1976 | Pier-Amory et al. | 89/178 |
| 4,269,109 | 5/1981 | Stoner | 89/198 |

FOREIGN PATENT DOCUMENTS 877 082  11/1942  France.
466655  7/1937  United Kingdom.

*Primary Examiner*—J. Woodrow Eldred
*Attorney, Agent, or Firm*—Oliff & Berridge

[57] ABSTRACT

An artillery weapon includes a cradle, a recoil mechanism body, a flange that fastens the body to the cradle, first rigid fastening structure for fastening the flange to the cradle and second fastening structure for fastening the body to the flange.

20 Claims, 3 Drawing Sheets

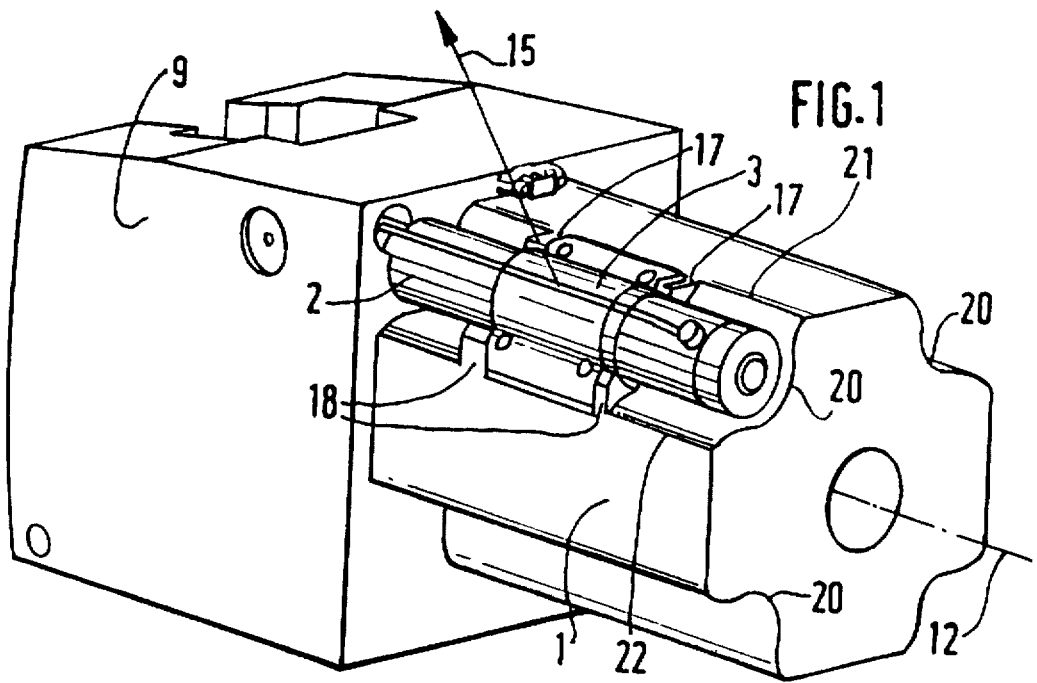
FIG. 1
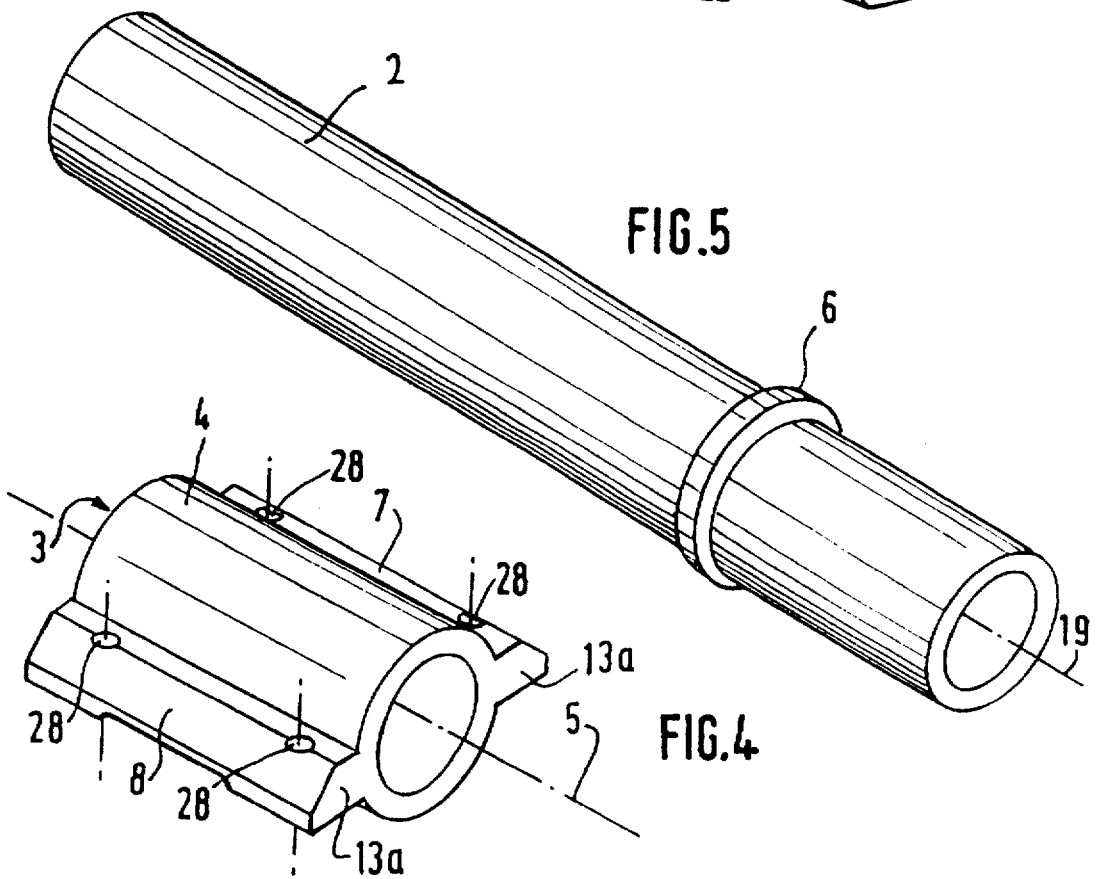
FIG. 5
FIG. 4

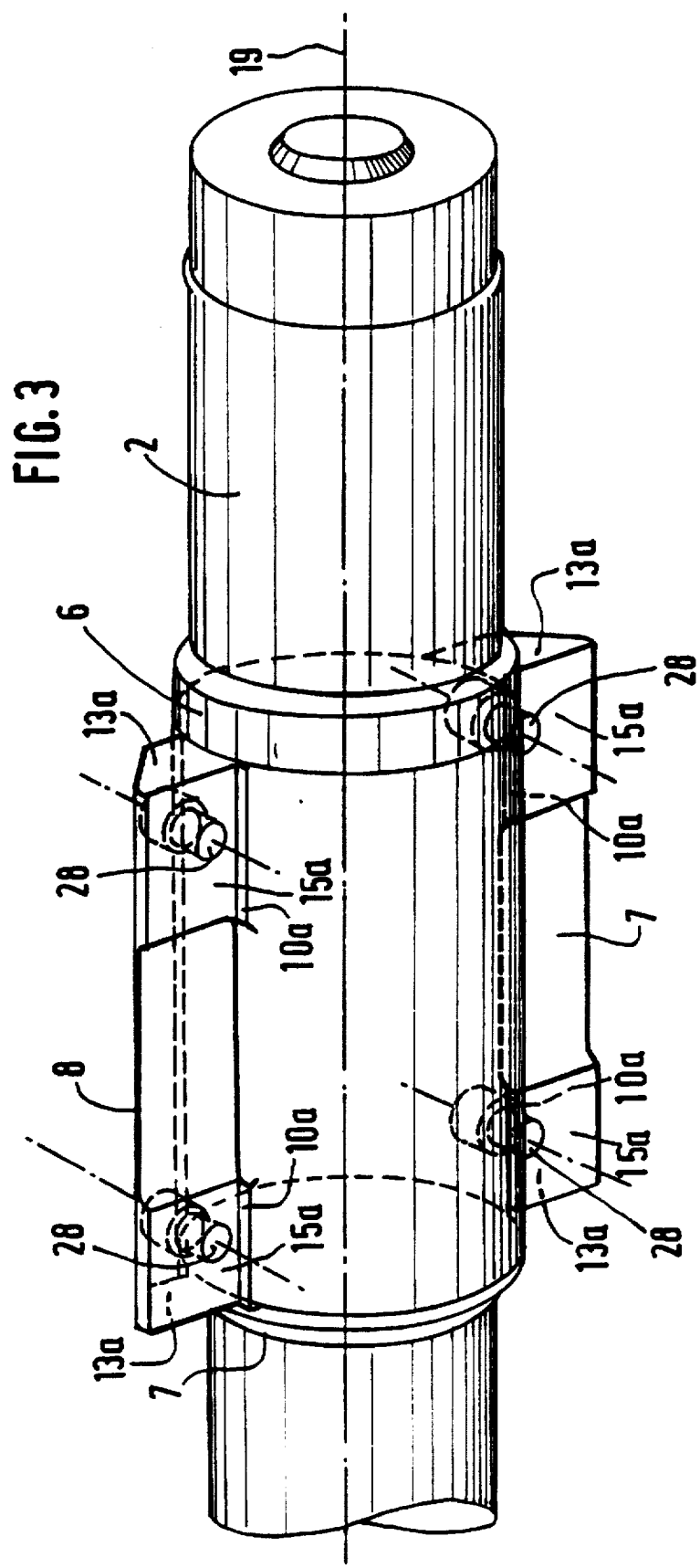

DEVICE FOR COUPLING A RECOIL MECHANISM TO A CRADLE AND METHOD FOR TRANSPORTING AN ARTILLERY WEAPON

BACKGROUND OF THE INVENTION

The present invention relates to a device, notably part of an artillery weapon, comprising a cradle, a recoil mechanism body and a flange to fasten the body to the cradle.

The present invention also relates to artillery guns comprising such a device.

On numerous artillery weapons, the cradle is linked to the breech ring by one or more recoil mechanisms, such as a recoil brake or recuperator. Each weapon includes a body integral with the cradle and a rod sliding in the body and fastened to the breech ring.

As a general rule, the body is fastened to the cradle using a flange in the shape of a half-shell fastened to the cradle by screw-nut connections. The cradle and the flange each have a cylindrical half-support. Once the flange is fastened in place, the two half-supports form a cylindrical housing moulding the cylindrical contours of the body. Two shoulders block the body in translation in parallel to its axis. The fastening position of the body to the cradle must be very precisely defined such that the half-supports must be machined with the flange already fastened to the cradle.

When the cradle comprises several recoil mechanisms, each flange must always occupy the same position and it is impossible to interchange one flange for another. However, in order to facilitate assembly operations and also to reduce the number of spare parts required, it is preferable to increase the interchangeability of all the parts and notably the flanges. Moreover, the afore-mentioned machining phase of the two half-supports is relatively complicated and constitutes an additional machining phase.

SUMMARY OF THE INVENTION

Consequently, the present invention proposes a device to overcome these disadvantages, in which the flange or flanges may be freely replaced and interchanged while ensuring more than adequate fastening of each recoil machanism to the cradle.

An object of the present invention is to provide a device, notably part of an artillery weapon, comprising a cradle, a recoil mechanism body, a flange to fasten the body to the cradle and first rigid fastening structure for fastening the flange to the cradle.

According to the invention, the device additionally includes second rigid fastening structure for fastening the body to the flange.

In the above-mentioned devices, the body was fastened to the cradle using the fastening of the flange. On the contrary, in the present invention, on the one hand the body is fastened to the flange and on the other hand the flange is fastened to the cradle.

The fastening of the flange to the cradle is independent of the fastening of the body to the flange such that the parts of the flange and the cradle involved in the fastening are standardized. It is therefore no longer necessary to carry out the above-mentioned machining of the two half-supports. The flange and the cradle may both be machined during their initial manufacture and the flanges may be interchangeably replaced at will.

Thus, the amount of required spare parts is considerably reduced. In the event of the flange breaking when the weapon is being used, the flange-body assembly may be freely replaced by any one of the flange-body assemblies of the same type available in stock (or it is possible to replace only the flange if the fastening mode of the body to the flange allows for such operation.

In addition, machining of the flange in preparation for fastening the body to the flange may be carried out during the manufacture of the flange and therefore poses no particular problems. The fastening of the body to the flange may be carried out just after manufacture of the flange and before its assembly on the cradle.

The rigid fastening of the body onto the cradle is thus ensured but machining and assembly of the different parts is facilitated, and the amount of required spare parts is reduced.

According to an advantageous version of the invention, the body may be partly tubular, the flange may comprise a tubular part adjusted so as to be slipped axially over the body to fasten the flange to the body. These tubular parts may, for example, be cylindrical.

Of course, the tight fit of the flange on the body may be provided. A shoulder of the body and one or more welding beads easily enable the body to be fastened rigidly to the flange.

According to another advantageous version of the invention, the flange and the body may be a one-piece assembly.

In this event, the part functioning as the flange and the body may, for example, be manufactured from a single blank.

According to a preferred version of the invention, the first rigid fastening structure may comprise first surfaces of the flange and the cradle arranged to cooperate for preventing the flange from translating with respect to the cradle in a direction that is orthogonal to an axis of the cradle, and for preventing the flange from moving in a radial direction along the axis.

In the event that the flange is fastened to the cradle by screw-nut connections that are radial to the axis of the cradle, the connections are prevented from having to bear the transmission of strains in the afore-mentioned direction between the flange and the cradle. The service life of the connections and of the flange assembly is thereby considerably lengthened.

According to another preferred version of invention, the cradle may be arranged such that at least some of the first surfaces borne by the cradle are roughly opposite each other when the flange is not fastened to the cradle.

According to a preferred version of the invention, the cradle may have longitudinal cut-out parts parallel to the axis of the cradle, and the first rigid fastening structure may be arranged such that the body lies roughly in one of the cut-out parts.

Another object of the invention is to provide a weapon, notably an artillery weapon, that comprises the above cradle/flange structure.

BRIEF DESCRIPTION OF THE DRAWINGS

Other characteristics and advantages of the invention will become apparent from the description of preferred embodiments given hereafter. In the appended drawings given by way of a non-exhaustive illustration:

FIG. 1 is a perspective view of a part of a weapon comprising an embodiment of the device according to the invention;

FIG. 3 is a perspective view of the lower face of the flange-body assembly shown in FIG. 2;

FIG. 4 is a perspective view of the flange shown in the previous figures; and

FIG. 5 is a perspective view of the body shown in the previous figures.

DETAILED DESCRIPTION OF PREFERRED EMBODIMENTS

Figure 2:
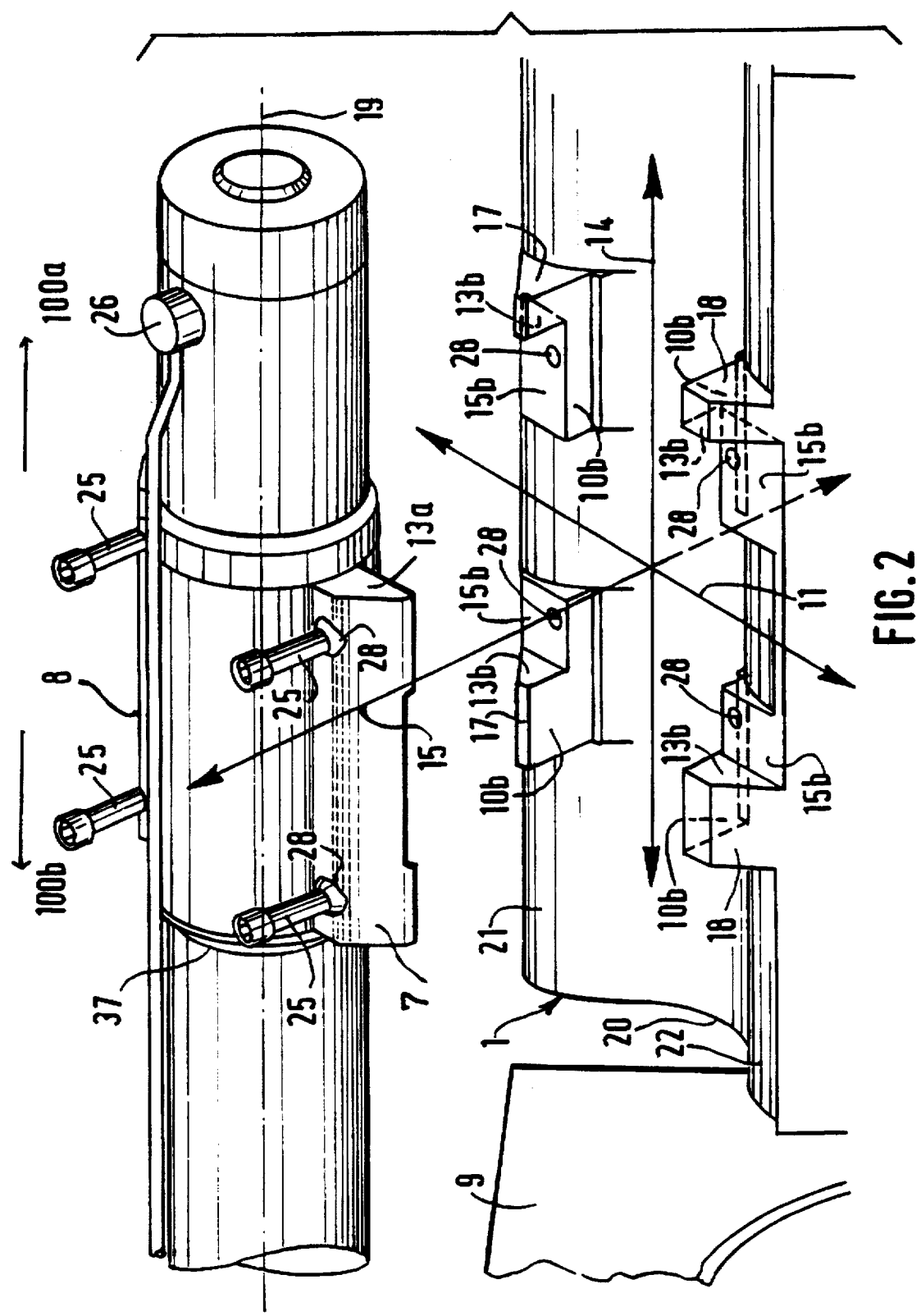
FIG. 2 is a perspective view showing the cradle and the flange fastened to the body before their assembly as on FIG. 1.

With reference to FIGS. 1 and 2, one embodiment of the device according to the invention is a part of an artillery weapon wherein the other parts are quite conventional and will not be described in detail.

The device comprises a cradle 1, a recoil mechanism body 2, for example a recoil brake, and a flange 3 that enables fastening of the body 2 to the cradle 1. The weapon comprises a breech ring 9 to which a rod (not shown) of the body 2 is fastened. As is well known, this rod slides in the body 2.

The device comprises a first rigid fastening means for fastening the flange 3 to the cradle 1, which will be described in detail hereafter.

According to the invention, the device additionally comprises a second rigid fastening means for fastening the body 2 to the flange 3 itself.

In the present example, with reference to FIG. 5, the body 2 is a partly tubular recoil brake body, in this case cylindrical. With reference to FIG. 4, the second means comprises a tubular part 4 having an axis 5 of the flange 3 adjusted so as to be slipped axially over the body 2 in order to fasten the flange 3 to the body 2. The inner diameter of the tubular part 4 of the flange and the outer diameter of the body 2 are designed to provide a tight fit for the flange on the body.

The second fastening means also comprises a ring-shaped shoulder 6 connected to the body 2 for preventing axial translation in a first direction 100a of the body 2 within the flange once the flange has been slipped over the body. With reference to FIG. 2, the second fastening means further comprises at least one welding bead 37 that connects the flange 3 to the body 2. The welding bead prevents axial translation of the body within the flange in a second direction 100b that is opposite to the first direction in which the flange is prevented from being able to axially translate in direction 100a. The welding bead 37 may, with advantage, be replaced by a screw and nut system (not shown).

The flange 3 includes two lateral extensions 7, 8 that are symmetrical with respect to the axis 5 of the flange and that extend along the tubular part 4.

In an alternative embodiment which is not shown, the flange 3 and the body 2 are in one piece. The part functioning as the body and the flange is, for example, can be manufactured using a blank or by forging.

If the flange and the body are in one piece, the second fastening means of the flange to the body forms an integral part of the one-piece assembly.

With reference to FIGS. 2 and 3, the first fastening means for fastening the flange to the cradle comprises first surfaces 10a and 10b respectively, of the flange 3 and the cradle 1. These surfaces 10a and 10b are arranged to cooperate so as to prevent the translation of the flange 3 with respect to the cradle in the direction 11, which is orthogonal to the axis 12 of the cradle and the direction 15 that is radial to the axis 12.

As may be seen from FIG. 2, the cradle 1 is arranged such that the first surfaces 10b carried by the cradle 1 lie roughly opposite each other when the flange 3 is not fastened to the cradle 1. In the present example, the surfaces 10b are orthogonal to direction 11.

The first means also comprises the second surfaces 13a, 13b, respectively, of the flange 3 and the cradle 1 and are arranged so as to cooperate in order to prevent the flange 3 from translating with respect to the cradle 1 in the direction which is parallel to the axis 12 of the cradle 1.

The cradle 1 is arranged such that the second surfaces 13b carried by the cradle 1 lie roughly opposite each other when the flange 3 is not fastened to the cradle 1. In the present example, the surfaces 13b are orthogonal to the direction 14.

In this case, the first surfaces 10a, 10b and the second surfaces 13a, 13b are also arranged so as to work together in order to prevent the flange 3 rotating with respect to the cradle 1 around an axis parallel to the direction 15 and radial to the axis 12 of the cradle 1.

The first means further comprises the third surfaces 15a, 15b, respectively, of the flange 3 and of the cradle 1 and are arranged so as to cooperate in order to prevent the flange 3 from translating with respect to the cradle 1 in the direction 15 radial to the axis 12 of the cradle 1.

The third surfaces 15a, 15b are also arranged so as to cooperate in order to prevent the flange 3 rotating with respect to the cradle 1 around an axis parallel to the axis 12 of the cradle 1, and also around an axis parallel to the direction 11 i.e. orthogonal to the radial direction 15 and to the axis 12 of the cradle.

In the present embodiment, the cradle 1 comprises respectively two first portions 17 and two second portions 18 aligned roughly in parallel to the axis 12 of the cradle 1. These portions 17, 18 each have a first 10b, second 13b, and third 15b surface. The cradle 1 is arranged so as to accommodate the flange 3 between the first and second portions 17, 18 such that these are respectively located on either side of the axis 19 of the body 2 when the body is mounted on the cradle.

The four portions 17, 17 and 18, 18 of the cradle form a rectangle.

With reference to FIG. 1, the cradle 1 has on its outside longitudinal cut-out parts 20 parallel to its axis 12 that given the cradle a cross-shaped profile. The four portions 17 17 and 18, 18 lie along the edges of these cut-out parts 20, the portions 17, 17 being on the edge 21 and the portions 18 being on the opposite edge 22. The body 2 lies substantially in one of these cut-out parts 20 when it is mounted on the cradle.

The first surfaces 10b of the first portions 17 are coplanar, as are those of the second portions 18. The same is true for the first surfaces 10a of the flange that lie on the same extensions 7, 8.

The second surfaces 13b of the portions 17, 18 positioned opposite each other on either side of the cut-out part 20 are also coplanar, as are the corresponding second surfaces 13a of the flange 3, i.e. the surfaces 13a lie at each axial end of the flange on the extensions 7, 8.

The third surfaces 15b of the four portions 17, 18 are all coplanar, as are the third surfaces 15a of the flange.

These different coplanar surfaces enables several parallel surfaces of the aforementioned types to be machined at once.

As described above, the flange 3 comprises third and fourth portions that are extensions 7 and 8, respectively. The device is arranged such that the flange 3 is fastened to the cradle 1 with the third 7 and fourth 8 portions respectively lying between the first 17 and second 18 portions of the cradle. In the fastened position of the body 2, the portions 17 and 7 are aligned, as are portions 18 and 8.

The symmetry of the flange 3 around its axis 5 enables its center of gravity to lie on the axis 19 of the body once the body has been fastened to the flange. In other embodiments, even if the shape of the flange is not symmetrical with respect to its axis, it is advantageous to arrange for the center of gravity of the flange to lie on the axis of the body once the body has been fastened to the flange in order to avoid causing an unbalance that might adversely affect a turning phase.

The first fastening means also comprise four screw-nut connections. These comprise screws 25 and matching tappings 28 on the third surfaces 15b, these tappings going through the extensions 7, 8 of the flange 3 and partly penetrating the cradle 1.

The third surfaces 15a and 15b are positioned such that the axis 19 of the body 2 once mounted lies in the same plane as these surfaces so as to avoid any transmission of strain by the screw-nut connections.

The body 2 has a purge hole 26 on its generating line opposite the axis 12 of the cradle in the fastening position of the body 2.

The manufacture and assembly of the device according to the invention are briefly described hereafter.

On the cradle 1, the four portions 17, 18 are machined by milling. The body 2 and the flange 3 are, however, machined separately. On the flange, the first surfaces 10a are machined by turning whereas the second 13a and third 15a surfaces are machined by milling by means of a rolling mill.

The flange and cradle, for example are machined independently so as to obtain standard dimensions for each part type. On a cradle having several recoil mechanisms, portions 17, 18 related to each body are machined one after the other.

Thereafter the body 2 and flange 3 are assembled with the flange being slipped over the body 2 up to the shoulder 6. The positioning of the welding bead 37 completes the rigid fastening of the body 2 to the flange 3.

The body-flange assembly is thereafter fastened onto the cradle 1 by means of the screw-nut connections.

The four portions 17, 18 of the cradle and the two extensions 7 and 8 of the flange work together to prevent the flange 3 translating with respect to the cradle 1 in each of the directions 11, 14 and 15 and to prevent the flange from rotating around an axis parallel to one of these directions.

The first, second and third surfaces 10a, 10b, 13a, 13b, 15a, 15b enables the portions 8, 17, 18 to withstand the strains resulting from these preventions thereby sparing the screw-nut connections.

Naturally, numerous modifications or improvements may be brought to the invention without leaving its scope.

Thus, different configurations of the flange and the cradle having a variable number of portions and various positions of the portions and surfaces may be envisaged.

We claim:

1. A device for use in an artillery weapon having a cradle, a recoil mechanism having a body connectable to the cradle and a flange for fastening the body to the cradle, said device comprising:

a first rigid fastener for fastening the flange to the cradle; and a second rigid fastener for fastening the body to the flange, wherein the first fastener comprises first surfaces of the flange and the cradle arranged to prevent the flange from translating with respect to the cradle in a direction that is substantially orthogonal to an axis of the cradle and substantially orthogonal to a radial direction to the axis of the cradle.

2. A device according to claim 1, wherein the body is at least partially tubular, and wherein the flange comprises a tubular part configured to axially slide over the body to fasten the flange to the body.

3. A device according to claim 1, wherein the cradle is arranged such that at least a pair of the first surfaces of the cradle lie substantially opposite each other.

4. A device according to claim 1, wherein the first fastener further comprises second surfaces of the flange and the cradle arranged to prevent the flange from translating with respect to the cradle in a direction parallel to an axis of the cradle.

5. A device according to claim 4, wherein the cradle is arranged such that at least two of the second surfaces lie substantially opposite each other.

6. A device according to claim 4, wherein at least one of the first surfaces and the said second surfaces is arranged to prevent the flange from rotating with respect to the cradle about an axis parallel to a direction radial to the axis of the cradle.

7. A device according to claim 4, wherein the first fastener further comprises third surfaces of the flange and the cradle arranged to prevent the flange translating with respect to the cradle in a direction radial to an axis of the cradle.

8. A device according to claim 7, wherein the third surfaces are arranged so as to cooperate to prevent the flange from rotating with respect to the cradle around at least one of an axis parallel to the axis of the cradle and an axis orthogonal to both the radial direction and the axis of the cradle.

9. A device according to claim 7, wherein the first fastener comprises screw-nut connections.

10. A device according to claim 9, wherein the screw-nut connections comprise tappings on said third surfaces.

11. A device according to claim 1, wherein the cradle comprises at least first and second portions each having at least one of first, second and third surfaces, the cradle being configured to accommodate the flange between the first and second portions.

12. A device according to claim 1, wherein the cradle comprises at least one of first and second portions aligned substantially parallel to the axis of the cradle, the flange comprises at least one of a third portion and a fourth portion, the device being arranged such that the flange is fastened to the cradle with at least one of the third portion and the fourth portion between at least one of the first and second portions.

13. A device according to claim 12, wherein the first, second, third and fourth portions of the cradle form a rectangle, the third and fourth portions of the flange occupying symmetrical positions on each side of the axis of the flange.

14. A device for use in an artillery weapon having a cradle, a recoil mechanism having a body connectable to the cradle and a flange for fastening the body to the cradle, said device comprising:

a first rigid fastener for fastening the flange to the cradle; and a second rigid fastener for fastening the body to the flange, wherein the cradle includes longitudinal cut-out parts on an outside thereof that are parallel to an axis of the cradle, and wherein the first fastener is configured such that the body substantially lies in one of the cut-out parts.

15. A cradle for a piece of artillery having a recoil mechanism body connectable to the cradle via a flange, said cradle comprising:

at least one projection connectable with at least one of the recoil mechanism and the flange;

a cut-out portion adjacent said at least one projection, said cut-out portion being adapted to receive the recoil mechanism body when the at least one projection is connected with at least one of the flange and the recoil mechanism body; and cooperating surfaces of the flange and the cradle arranged to prevent the flange from translating with respect to the cradle in a direction that is substantially orthogonal to an axis of the cradle and substantially orthogonal to a radial direction to the axis of the cradle.

16. A piece of artillery comprising:

a cradle;

a recoil mechanism having a body connectable to the cradle; and a flange attachable to both the cradle and the body for fixedly securing the body to the cradle, wherein said cradle includes at least one projection including at least one surface cooperable with a corresponding at least one surface of the flange.

17. A device for use in an artillery weapon having a cradle, a recoil mechanism having a body connectable to the cradle and a flange for fastening the body to the cradle, said device comprising:

first rigid fastener means for fastening the flange to the cradle; and second rigid fastener means for fastening the body to the flange, wherein the first fastener means comprises first surfaces of the flange and the cradle arranged to prevent the flange from translating with respect to the cradle in a direction that is substantially orthogonal to an axis of the cradle and substantially orthogonal to a radial direction to the axis of the cradle.

18. A method for transporting an artillery weapon having a cradle, a recoil mechanism having a body connectable to the cradle and a flange for fastening the body to the cradle, said method comprising:

fastening the flange to the cradle using a first fastener, wherein the first fastener comprises first surfaces of the flange and the cradle arranged to prevent the flange from translating with respect to the cradle in a direction that is substantially orthogonal to an axis of the cradle and substantially orthogonal to a radial direction to the axis of the cradle;

fastening the body to the flange; and transporting the artillery weapon.

19. The method according to claim 18, wherein the body is at least partially tubular, and wherein the flange comprises a tubular part that axially slides over the body to fasten the flange to the body.

20. The method according to claim 18, wherein the cradle comprises at least first and second portions each having at least one of first, second and third surfaces, the cradle accommodating the flange between the first and second portions.

* * * * *